United States Patent [19]

Wessel

[11] Patent Number: 4,630,055

[45] Date of Patent: Dec. 16, 1986

[54] DIPOLE ARRANGEMENT IN A SHEATH

[75] Inventor: Peter Wessel, Brussels, Belgium

[73] Assignee: Diehl GmbH & Co., Nuremberg, Fed. Rep. of Germany

[21] Appl. No.: 504,225

[22] Filed: Jun. 14, 1983

[30] Foreign Application Priority Data

Jun. 16, 1982 [DE] Fed. Rep. of Germany ....... 3222584

[51] Int. Cl.[4] ................................................ G01S 7/38

[52] U.S. Cl. ........................................ 343/12; 102/505

[58] Field of Search ............................ 343/18 E, 18 B; 102/505

[56] References Cited

U.S. PATENT DOCUMENTS

| | | | |
|---|---|---|---|
| 3,500,409 | 3/1970 | Cash | 343/18 B |
| 3,765,336 | 10/1973 | Kulsik | 343/18 B X |
| 4,195,571 | 4/1980 | Beeker et al. | 102/505 |
| 4,404,912 | 9/1983 | Sindermann | 102/505 |

FOREIGN PATENT DOCUMENTS

| | | | |
|---|---|---|---|
| 834596 | 5/1960 | United Kingdom | 343/18 B |

*Primary Examiner*—T. H. Tubbesing
*Assistant Examiner*—Gilberto Barrón, Jr.
*Attorney, Agent, or Firm*—Scully, Scott, Murphy & Presser

[57] ABSTRACT

A dipole arrangement which is located in a sheath,including segments of ejectable dipoles sequentially arranged within the sheath. The dipole can be ejected from the sheath within a short time interval and, subsequent to ejection, will rapidly form a large-surfaced and homogeneous cloud. The segments of the sheath which has a polished inner surface, as viewed in the ejecting direction, evidence an envelopment with a reducing number of windings which consists of a thin metal foil, smooth on both sides thereof, and wherein the dipoles of the enveloped segments, or the only partially enveloped segments, are centripetally pretensioned. The dipoles which are prestressed in the segments act as drive springs for the metal foil which encompass the segment whereby, dependent upon the winding number of the metal foil, there is achieved a time-delayed release of the dipoles.

8 Claims, 6 Drawing Figures

DIPOLE ARRANGEMENT IN A SHEATH

BACKGROUND OF THE INVENTION

1. Field of the Invention

The present invention relates to a dipole arrangement disposed in a sheath, including segments of ejectable dipoles sequentially arranged within the sheath.

2. Discussion of the Prior Art

German Laid-open Patent Application No. 30 15 719 discloses dipole segments of different lengths arranged in sections within a sheath. The dipole segments are ejectable from the sheath through the action of a piston. The piston, in turn, is actuable in response to a gas pressure-generating charge.

British Pat. No. 834 596 teaches dipole segments, bundled together by means of loose, thin paper, and which are then arranged within a sheath formed of reinforced paper. In addition, this patent provides that one section of the paper which directly encompasses the dipoles can to be inserted as a tail portion into the mass of dipoles, in a generally radial direction.

Finally, the British Pat. No. 834 596 sets forth that for an extraordinarily large number of circularly bundled dipoles they can be arranged in a meandering configuration interiorly of the bundle, employing one section of the sheath as a tail portion. By means of the tail portion, the mass of the dipoles are then provided in approximately two equally large quantities. Thereby, the dipole surface that contacts the air is generally approximately doubled.

For a dipole segment, arranged in a sheath, to achieve a rapid and wide cloud formation, it is necessary that the dipole segment be ejected from the sheath relatively easily and rapidly, and that subsequent to leaving the mouth of the ejecting tube, the individual dipoles separate independently. When this result is attained, a radar-relevant or detectable cloud is formed. In addition to the utility of such a cloud as a signal generator in rescue operation, the generation of such a cloud can be used to deceive target seeking radar installations.

SUMMARY OF THE INVENTION

Accordingly, it is an object of the invention to provide a constructively simple, inexpensive dipole arrangement for an ejection sheath which can be ejected from the sheath in a short time interval and, subsequent to ejection is rapidly formable into large-surfaced and homogeneous cloud.

The foregoing object is achieved in a dipole arrangement wherein the segments of the sheath, which have a polished inner surface, as viewed in the ejecting direction, evidence an envelopment with a reducing number of windings. The windings, consist of smooth thin metal foil. The dipoles of the fully or partially enveloped segments are centripetally pretensioned.

The metal foil slides easily along the highly polished inner surface of the sheath, so that the energy required for ejection of the segments from the sheath is relatively low. Compared to a standardized ejection charge of the prior art this improved performance allows for the ejection width of the segments to be increased by about 30%. This results in a corresponding increase in diameter of the cloud generated by the ejection of dipoles from an aircraft in a corresponding increase in distance elevation of a cloud above an ejecting locale when ejected from the ground. This is so because the segments traverse an extremely long distance at high average velocity upon the release of the dipoles.

The dipoles which are prestressed in segments act as drive springs for the metal foil which encompass the segment whereby, dependent upon the number of metal foil windings, a time-delayed release of the dipoles is achieved.

A segment which is provided with a lower number of windings releases the dipoles sooner than a segment having a greater number of windings.

For a stationary arranged sheath of the prior art, under calm conditions, a radar-relevant cloud of approximately 4 meter diameter is achieved at a height of about 6 meters. At a wind velocity of 3 m/sec. a cloud a diameter of 3 meters and a length of approximately 40 m is formed at a height of 4 meters.

During ejection of a dipole arrangement, of the present invention, from an aircraft a radar-relevant cloud approximately 50% greater than the sideview surface of an aircraft, such as an F-104G Starfighter, is created. Moreover, the diameter of the cloud is greater than the largest cross section of a combat aircraft. This produces an overall effective defense means against ground-supported and air-supported defense installations with target tracking radar.

In accordance with a specific feature of the invention the segment located at the mouth of the sheath includes an envelopment having a winding number of 1.2 to 0.75 so that radar evading cloud is formed immediately after dipole ejection. The deflecting period for the enemy radar is thereby extremely short, since the cloud surfaces, which are directed by the radar as the target, are produced much sooner than the clouds formed in accordance with the teachings of the prior art. Thus, it is sufficient to have a cloud formed up to 70% in order to deflect the radar from the aircraft.

Pursuant to another feature of the invention, the segment, which is arranged at the mouth of the sheath, need not include an envelope. This results in an increase in the size of the cloud.

In accordance with a further feature of the present invention, a frequency spectrum is provided which is present uniformly for each surface unit of the completed cloud. The segment length is selected such that the dipole associated with the highest frequency covers approximately one square meter of the completed cloud in a radar-relevant manner. Those dipoles of a segment which in themselves are not adequate to cover a square meter of the completed cloud, are complemented by respective dipoles of other segments in order to provide this function. This results in a correspondingly acceptable distribution of dipoles in the longitudinal direction of the cloud as well as in the transverse direction. This is so in that long dipoles form a network structure because of swirling.

Pursuant to another aspect of the invention, in addition to the low amount of friction encountered during ejection of the segments from the sheath, the unwinding of the metal foil from the bundled dipoles occurs quite rapidly due to the low degree of friction between the windings of the foil or, respectively, the dipoles and the foil. The formation of a dipole cluster of large numbers of dipoles is thereby safely avoided.

An inexpensive metal foil is provided by aluminum metal foil having a thickness of approximately 0.1 mm thick.

The unitary nature of the metal foil employed for each segment allows, after sheath ejection, due to the radially expanding dipoles, the plastically deformable metal foil to have its winding radius increase until there is reached a winding number of less than 1, and a sufficiently large spacing (window) is achieved between the two ends of the foil. On the basis of this window, by means of air flow, the dipoles are released from the segment (packet) and, on the other hand, the foil itself is detached from the packet. Thereby, the packet can be unhinderedly unfolded into a partial cloud due to tensile force present in the packet and outflowing air. A minimum of 10 units and a maximum of about 25 partial cloud units will, through overlapping, produce the actual cloud.

BRIEF DESCRIPTION OF THE DRAWINGS

Reference may now be had to the following detailed description of preferred embodiments of the invention, taken in conjunction with the accompanying drawings, in which.

DETAILED DESCRIPTION

Figure 1:
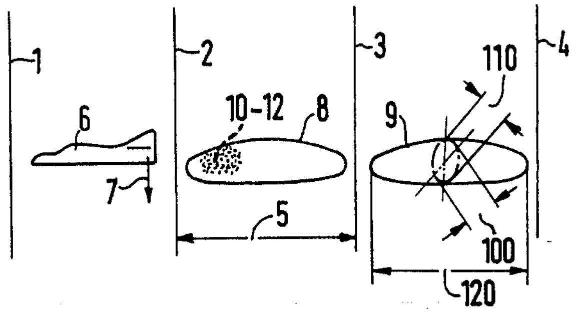
FIG. 1 illustrates an aircraft and clouds which are formed from separate dipole arrangements.

In accordance with FIG. 1, a radar scanner of an enemy radar is represented by the scan lines 1 through 4. The scan width 5 is approximately 21 meters. Located between the scan lines 1 and 2 is an aircraft 6 which, in accordance with arrow 7, has ejected dipoles 10 through 12 at two intervals, thereby forming the radar-relevant clouds 8 and 9 which form between the scan lines 2 through 4. Comparison of the surfaces of the aircraft 6 and the clouds 8 or 9, illustrate that cloud 8 or 9 is each approximately 30% larger than the represented surface area of the aircraft.

The scan lines 1 through 4 correspond to a pregiven target distance for a usual radar with a pulse width of 200 μs. The speed of the aircraft is about 300 m/sec. The ejection sequence of the dipole arrangement is about 100 meters per second.

Figure 2:
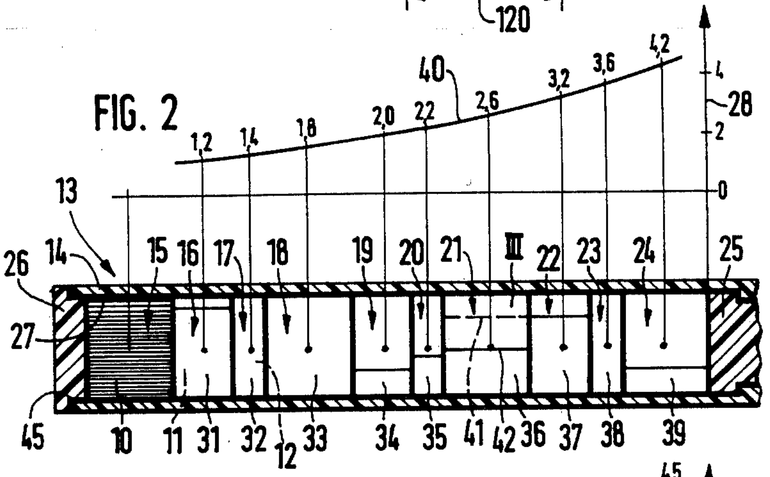
FIG. 2 illustrates a dipole arrangement with a sheath.

In accordance with FIG. 2, a dipole arrangement 13 consists of a sheath or casing 14 with a square internal cross-section, dipole segments or packets 15 through 24, a piston 25 and an end closure 26. The internal surface 27 of the sheath 14 is highly polished. The individual dipoles 10 through 12 consist of aluminum-covered glass fibers. These glass fibers are disposed, strand-shaped, in the longitudinal direction of the sheath 14, with the length of the dipoles 10 through 12 corresponding to the length of the individual segments 15 through 24.

In accordance with the graph drawn above the sheath 14, with only the ordinate 28 plotted, the number of windings for an envelope of thin aluminum foil, smooth (polished) on both sides, with a cover of about 0.1 mm. is demonstrated.

Figure 3:
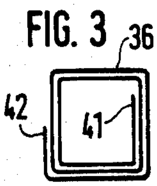
FIG. 3 illustrates a detail taken at line III in FIG. 2.

A graph 40, which is obtained experimentally, facilitates determination of the number of winding of foils 31 through 39 for each individual dipole segment 16 through 24. Thus, the winding number for dipole segment 16 is 1.2, for segment 24 it is 4.2, and for segment 21 it is 2.6 (FIG. 3). Segment 15, at the mouth 45 of the sheath 14, does not incorporate any envelope. Here the dipoles 10 are arranged "naked" as packet segment 15 within the sheath 14.

In accordance with FIG. 3 there can be ascertained the manner in which foil 36 having 2.6 windings is obtained. The beginning 41 of foil 35 is positioned offset relative to end 42. The foil 36 is released from FIG. 2, and for improved representation, is drawn with a spacing between the windings. In actuality, the windings of the foil 36 are closely positioned against each other. The applied pressure between the windings of the foil is created during the introduction of the individual dipole segments 16 through 14, prior to their insertion into the sheath 14, have larger dimensions in the circumferential direction then the internal cross section of the sheath 14. For insertion of segments 16 through 24 into sheath 14, these segments are suitably compressed. Segment 15 is pressed into the sheath after all of segments 16 through 24 have been fitted so that the dipoles 10 thereof are centripetally prestressed.

In operation, in accordance with the arrangement of FIGS. 2 and 3, the piston 25, which is driven in the direction towards mouth 45, lifts the end closure 26, through the segments 16 through 24, from the mouth 45. This results in the initial ejection of the "naked" segment 15. The centripetally prestressed dipoles 10 tend to radially spread apart and, after leaving mouth 45, are swirled by the oncoming air.

This sequence repeats itself with subsequent segments 16 through 24 wherein, in accordance with the different winding numbers of the metal foil about segments 16 through 24, the commencement of the swirling is delayed timewise.

For segment 16 with a winding number of 1.2, the compressed dipoles 10 act as a spring element. This spring element acts in the radial direction inasmuch as the dipole band expands radially. In this manner the dipoles 10 unwind metal 31 circumferentially releasing the dipoles. Only at that point in time does the swirling of the dipoles 10 begin through action of the onflowing air stream. Upon swirling of dipoles 10 the metal foil 31 is distanced therefrom.

Because of the increasing number of windings of metal foils 31 through 39, which each increases in number in the direction of piston 25, there is obtained a correspondingly increasing delay in the beginning of the swirling of dipoles 10. This, as illustrated in FIG. 1, leads to an extended lengthwise dipole cloud 8 or 9, which, having a diameter 100, height 110 and length 120, is substantially larger than the corresponding mass of the aircraft 6.

The dipole segments 15 through 24, which have different lengths, in accordance with the required frequency band, are generally arranged at intervals within the sheath 14. This results in cloud 8 or 9 possessing the required frequency spectrum through each surface unit.

Figure 4:
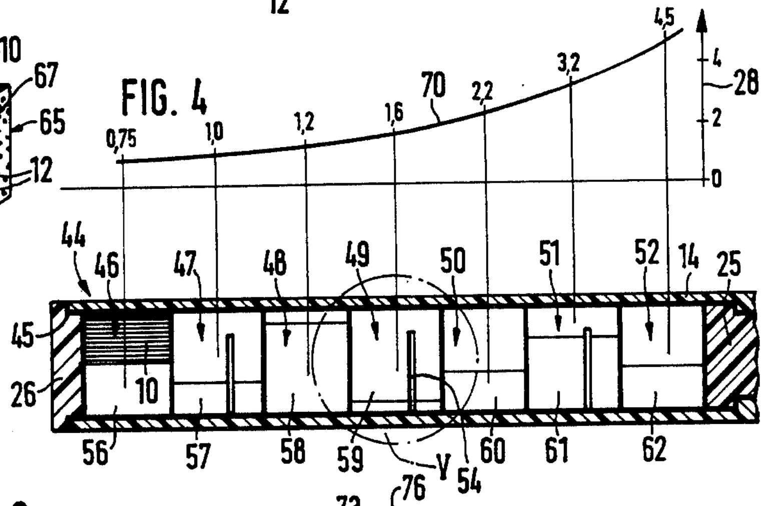
FIG. 4 shows a further embodiment of a dipole arrangement with a sheath.

In accordance with FIG. 4, dipole segments 46 through 52 of a dipole arrangement 44 are constructed of packets of equal length. The segment 46, which is located at the mouth 45 of the sheath 14, is, because it has less than a full winding, only partially enveloped by metal foil 56. This signifies that 25% (it possess 0.75 of a winding) of the packet surface is directly in contact with the inner surface 27 of the sheath 14, while 75% of the surface is enveloped by the metal foil 56.

In order to obtain the desired frequency spectrum, the dipole segments 47, 49, 51 with dipoles oriented in the longitudinal direction of the sheath 14, are slit transverse to the longitudinal axis of the sheath 14 (slit line 54). The slit (slit depth 53) through the metal foil and the dipoles is so formed such that the dipoles 12 (each segment 47, 49, 51) with the shortest length (partial quantity 65) radar-relevant cover with respect to their number approximate one square meter of cloud surface.

This permits dipoles 11, which are present in the same number (partial quantity 66), to fulfill the previously mentioned requirement. The remaining partial quantity 67 of dipoles 10 does not produce, in itself, a radar surface of one square meter. This partial quantity 67 is, however, completed by the adjoining dipoles 10 of the segments 48 and 50.

Figure 5:
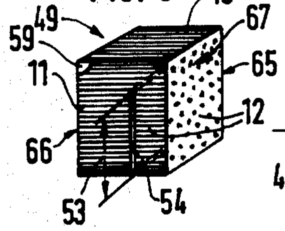
FIG. 5 is a detail taken in the circled portion V of FIG. 4.

In FIG. 5, the slit depth is designated by reference numeral 53, and the slit line by 54. The slit is effectuated by means of a suitable arrangement prior to packing segments 46 through 52 into sheath 14 into the enveloping metal foil and the applicable dipoles. Unslitted dipoles 10 then produce partial quantity 67.

The graph 70 which is represented in the upper portion of FIG. 4 is analogous to FIG. 2. Graph 70 represents the number of windings of the metal foil as a function of segments 46 through 52.

The function of the dipole arrangement of FIG. 4 corresponds to the function described with respect to FIGS. 3 and 4.

The swirling of dipoles begin immediately, in so far as the dipoles are not covered by foil 56, after ejection in the direction of arrow 7 (FIG. 1) in the same manner as described with regard to FIG. 2. Only after foil 56 has been detached is complete discharge of segment 46 possible. As a result, the swirling of the dipoles 10 is extended in time through the action of metal foil 56.

The metal foil in segments 47, 49 and 51, which include dipoles 10 through 12, is pulled up to a number of windings of less than one subsequent its ejection from the sheath 14 due to the radial pressure of said dipoles. This continues until the onflowing air loosens the foil releasing and distributing the dipoles.

A sheath having a square internal cross-section, whose internal edge length is 22 mm, whose length in the axial direction is approximately 180 mm and which is provided with the described dipole segments, and wherein each segment is provided with approximately 400,000 dipoles, produces a radar-relevant cloud with maximum dimensions of approximately 16 meters in length, 4.5 meters in height and 4.5 meters in diameter when ejected from aircraft flying at a speed of 300 meters per second.

In the arrangements dipicted in FIGS. 2 through 5, the dipoles 10 through 12 of collective segments are oriented in the axial direction of the sheath 14. In addition, for the collective of the segments, with the exception of the segments 47, 49 and 51, it is possible to orient the segment dipoles transverse to the longitudinal direction of the sheath 14. Furthermore, in lieu of the square internal cross-section of sheath 14, a circular cross-section can also be employed.

The collective segments 15–24 and 46–52 contain dipoles 10, or 10, 11 and 12, respectively which act as "spring elements."

Figure 6:
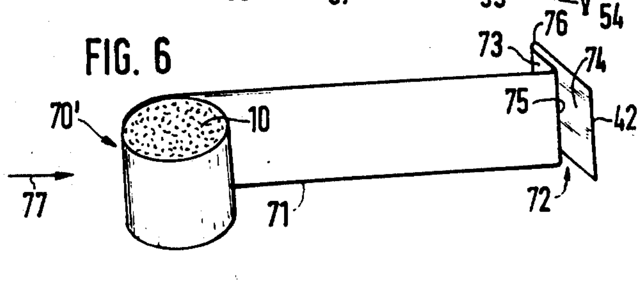
FIG. 6 illustrates an individual dipole segment.

In FIG. 6, dipole segment 70 includes dipoles 10 and metal foil 71. Metal foil 71 is provided with a unitary air brake 72. The air brake 72 consists of two brake surfaces, surfaces 73 and 74. The braking surfaces are defined by edges 75 and 76 of the foil 71. Air brake 72 lies folded within the sheath 14 in a manner such that after ejection it aids the air streaming in the direction of arrow 77 to support the unwinding sequence of foil 71 from segment 70. The essential concept of this embodiment lies in the extremely effective air brake created by the twice bent ends of foil 71. The commencement of the unwinding sequence is accelerated. The time required for unwinding is, however, not substantially accelerated, inasmuch as a free foil end will, similar to a "flag", act as a brake because of the creation of an air vortex. This air brake 72 is compact and, as a result, is independent of the number of the dipoles 10 of segments 70.

The above-described measure can also be utilized for slitted segments 47, 49, 51.

What is claimed is:

1. A dipole arrangement comprising a sheath having a polished inner surface; segments of ejectable dipoles sequentially arranged within said sheath; and smooth thin metal enveloping said segments in a reducing number of windings, said dipoles of said enveloped segments being centripetally pretensioned.

2. A dipole arrangement in accordance with claim 1 wherein said segments comprise dipoles of equal length; and said smooth, thin metal enveloping said segments, as viewed in the ejecting direction, have a reducing winding number of from 4.2 to 1.2.

3. A dipole arrangement in accordance with claim 1 wherein all of said segments, with the exception of the segment at the mouth of said sheath, are enveloped with said thin metal.

4. A dipole arrangement in accordance with claim 1 including segments having dipoles of equal length, said segments provided with slits extending transverse to the longitudinal axis of said sheath, the depth of said slits being dependent upon the required number of dipoles for the highest frequency surface unit.

5. A dipole arrangement in accordance with claim 1 wherein said thin metal is highly polished on both surfaces and is plastically deformable.

6. A dipole arrangement in accordance with claim 1 wherein said thin film is aluminum having a thickness of 0.1 mm.

7. A dipole arrangement in accordance with claim 1 wherein said thin film is unitary for each segment.

8. A dipole arrangement in accordance with claim 1 wherein an air break is provided, said air break formed by two edges of said thin metal extending transverse to the winding direction at the free end thereof.

* * * * *